United States Patent [19]

Sado

[11] Patent Number: 5,713,033
[45] Date of Patent: Jan. 27, 1998

[54] ELECTRONIC EQUIPMENT DISPLAYING TRANSLATED CHARACTERS MATCHING PARTIAL CHARACTER INPUT WITH SUBSEQUENT ERASURE OF NON-MATCHING TRANSLATIONS

[75] Inventor: Ichiro Sado, Yokohama, Japan

[73] Assignee: Canon Kabushiki Kaisha, Tokyo, Japan

[21] Appl. No.: 176,505

[22] Filed: Jan. 3, 1994

Related U.S. Application Data

[63] Continuation of Ser. No. 735,673, Jul. 29, 1991, abandoned, which is a continuation of Ser. No. 522,506, May 10, 1990, abandoned, which is a continuation of Ser. No. 289,522, Dec. 27, 1988, abandoned, which is a continuation of Ser. No. 54,054, May 26, 1987, abandoned, which is a continuation of Ser. No. 596,413, Apr. 3, 1984, abandoned.

[30] Foreign Application Priority Data

Apr. 6, 1983 [JP] Japan ................ 58-59311

[51] Int. Cl.⁶ ........................... B41J 5/30
[52] U.S. Cl. .................. 395/796; 395/757; 395/797; 395/353; 400/110
[58] Field of Search ............ 364/419.01, 419.02, 364/419.1, 419.11, 419.12, 419.13, 419.15; 369/419.05, 419.07; 395/600, 752, 753, 754, 755, 757, 758, 797, 798, 352, 353, 796; 400/110

[56] References Cited

U.S. PATENT DOCUMENTS

| | | |
|---|---|---|
| 4,218,760 | 8/1980 | Levy .................................. 364/900 |
| 4,255,796 | 3/1981 | Gabbe et al. ........................ 364/900 |
| 4,339,806 | 7/1982 | Yoshida ............................... 364/900 |
| 4,409,479 | 10/1983 | Sprague et al. .................... 250/237 G |
| 4,438,505 | 3/1984 | Yanagiuchi et al. ............... 364/419 X |
| 4,453,217 | 6/1984 | Boivie ................................. 395/600 |
| 4,531,201 | 7/1985 | Skinner, Jr. ........................ 364/900 |
| 4,559,598 | 12/1985 | Goldwasser et al. ............. 364/419.1 |
| 4,580,241 | 4/1986 | Kucera ............................. 364/419.12 |
| 4,597,056 | 6/1986 | Washizuka ........................ 364/900 |
| 4,648,070 | 3/1987 | Washizuka ..................... 364/419.02 |
| 4,843,589 | 6/1989 | Yoshida et al. ................. 364/419.02 |

FOREIGN PATENT DOCUMENTS

| | | | |
|---|---|---|---|
| 0158819 | 12/1979 | Japan | ................ 364/419 |
| 0050464 | 5/1981 | Japan | ................ 364/419 |
| 0019936 | 2/1983 | Japan | . |

OTHER PUBLICATIONS

Lexis™ Handbook L82-1, Mead Data Central, 1980, 1-48.
Arellano et al.; "Word Generation System for Typist"; *IBM Technical Disclosure Bulletin*; v17 n8; Jan. 1975.

*Primary Examiner*—Gail O. Hayes
*Assistant Examiner*—Stephen R. Tkacs
*Attorney, Agent, or Firm*—Fitzpatrick, Cella, Harper & Scinto

[57] ABSTRACT

Electronic equipment includes a memory containing first information such as KANA characters and second information such as KANJI characters corresponding to the first information, a key input device for inputting the first information, a display for displaying the second information corresponding to the input first information, and a control for reading out all of the second information corresponding to the input first information, from the memory, displaying it on the display and sequentially erasing the displayed second information which no longer correspond to the input first information subsequently inputted by the input device.

9 Claims, 3 Drawing Sheets

| | KEY INPUT | EXAMPLE OF DISPLAY |
|---|---|---|
| 20 | い | ①以 ②異 ③衣 ④位 ⑤胃 ⑥生 ⑦一 ⑧着 ⑨色 ⑩市 (其他)10 |
| 21 | ち | ①一 ②市 ③壱 ④着 |
| 22 | じ | ①着 |
| 23 | (IDENTIFICATION KEY) | (着) |
| 24 | る | ①着 |
| 25 | (IDENTIFICATION KEY) | 着 |
| 26 | る | ①涙 ②累 ③塁 ④類 ⑤流 ⑥留 |
| 27 | い | ①涙 ②累 ③塁 ④類 |
| 28 | (SELECTION KEY) | ①涙 ②累 ③塁 ④類 |
| 29 | (IDENTIFICATION KEY) | 累 |

FIG. 3

| | KEY INPUT | EXAMPLE OF DISPLAY |
|---|---|---|
| 20 | い | ①以 ②異 ③衣 ④位 ⑤胃 ⑥生 ⑦一 ⑧着 ⑨色 ⑩市 ⑪其他 |
| 21 | ち | ①一 ②市 ③壱 ④着 |
| 22 | с | ①着 |
| 23 | IDENTIFICATION KEY | (着) |
| 24 | る | ①着 |
| 25 | IDENTIFICATION KEY | 着 |
| 26 | る | ①涙 ②累 ③塁 ④類 ⑤流 ⑥留 |
| 27 | い | ①涙 ②累 ③塁 ④類 |
| 28 | SELECTION KEY | ①涙 ②累 ③塁 ④類 |
| 29 | IDENTIFICATION KEY | 累 |

ELECTRONIC EQUIPMENT DISPLAYING TRANSLATED CHARACTERS MATCHING PARTIAL CHARACTER INPUT WITH SUBSEQUENT ERASURE OF NON-MATCHING TRANSLATIONS

This application is a continuation of application Ser. No. 07/735,673 filed Jul. 29, 1991, now abandoned, which is a continuatin of application Ser. No. 07/522,506, filed May 10, 1990, now abandoned, which is a continuation of application Ser. No. 07/289,522, filed Dec. 27, 1988, now abandoned, which is a continuation of application Ser. No. 07/054,054, filed May 26, 1987, now abandoned, which is continuation of application Ser. No. 06/596,413, filed Apr. 3, 1984, now abandoned.

BACKGROUND OF THE INVENTION

1. Field of the Invention

The present invention relates to electronic equipment capable of converting or translating a first language to a second language or vice versa such as a KANA-to-KANJI conversion.

2. Description of the Prior Art

In most prior art KANA to KANJI conversion electronic equipment, a KANJI character is outputted by depressing a conversion key after inputting KANA characters. This results in increase of the number of key strokes and the KANJI character, even if it is a single character, cannot be identified until the last KANA character is inputted. In order to resolve this problem, a method of displaying the amount of anticipated information has been proposed. Even in this method, the KANJI character is not identified until the information is displayed. Thus, all of the anticipated information must be displayed by depressing the conversion key and the desired information must be selected from the displayed information.

In a translating machine which translates a first language to a second language or vice versa, in order to obtain the second language corresponding to the first language, the first language is first inputted, the candidate second languages corresponding to the input first language are sequentially displayed, and a proper one is selected from the candidates.

SUMMARY OF THE INVENTION

It is an object of the present invention to provide electronic equipment capable of conversion or translation with a small number of key strokes.

It is another object of the present invention to provide electronic equipment which displays information corresponding to input characters, and erases the information which no longer corresponds to the input characters from the display screen as the number of input characters increases.

It is another object of the present invention to provide electronic equipment which reads out information corresponding to key input information inputted from keys of a keyboard, from a memory so that desired information is selected from the output information, supplies all candidate information of the information stored in the memory to output means for each keying of the keyboard, and erases the output information which are no longer candidates, for each keying.

BRIEF DESCRIPTION OF THE DRAWINGS

FIG. 3 shows KANA inputs and displayed KANJI characters corresponding thereto.

DETAILED DESCRIPTION OF THE PREFERRED EMBODIMENT

Figure 1:
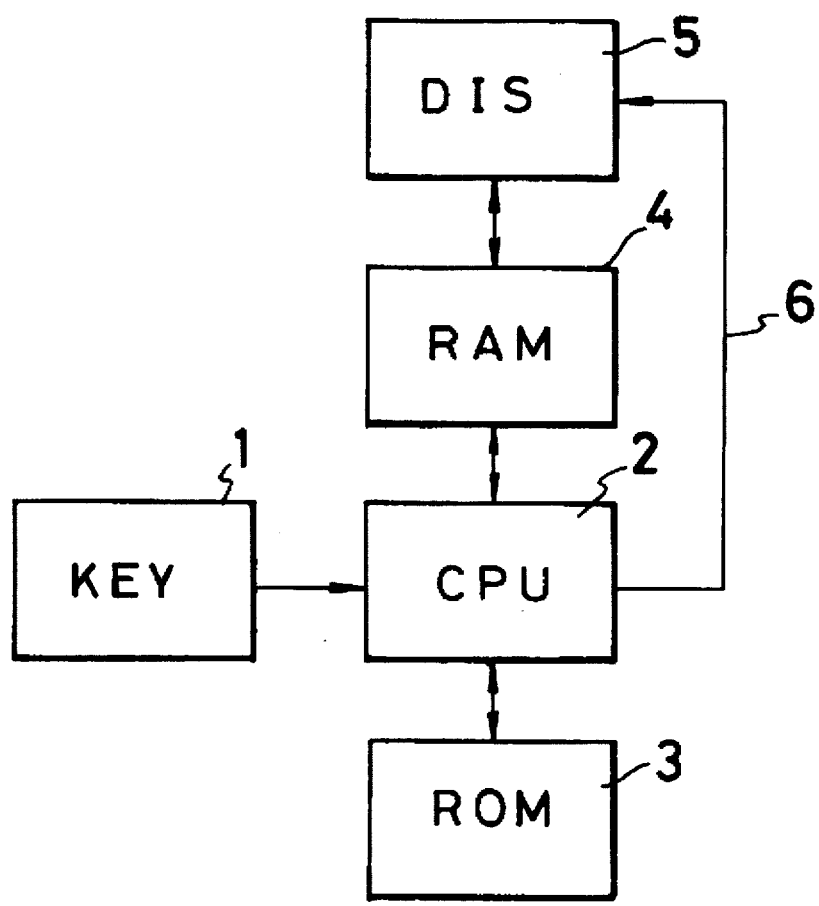
FIG. 1 is a block diagram of one embodiment of electronic equipment having a KANA to KANJI conversion function in accordance with the present invention.

FIG. 1 shows a block diagram of one embodiment of the electronic equipment having the KANA to KANJI conversion function in accordance with the present invention. Numeral 1 denotes an input keyboard having a plurality of KANA keys, an identification key for indicating that a KANA-to-KANJI converted output KANJI character is a desired KANJI character and selection key for selecting the desired KANJI character when a plurality of KANJI characters are outputted in correspondence to input KANA characters. Numeral 2 denotes a central processing unit CPU for processing information. Numeral 3 denotes a read-only memory ROM which contains KANA characters and corresponding KANJI characters, and numeral 4 denotes a random access memory RAM which reads out and temporarily stores a portion of the content of the ROM 3, and stores display information for a display 5. The RAM 4 is also used as a processing memory for the CPU 2. The display 5 displays the information and includes a driver. Numeral 6 denotes a synchronization signal line.

Figure 2:
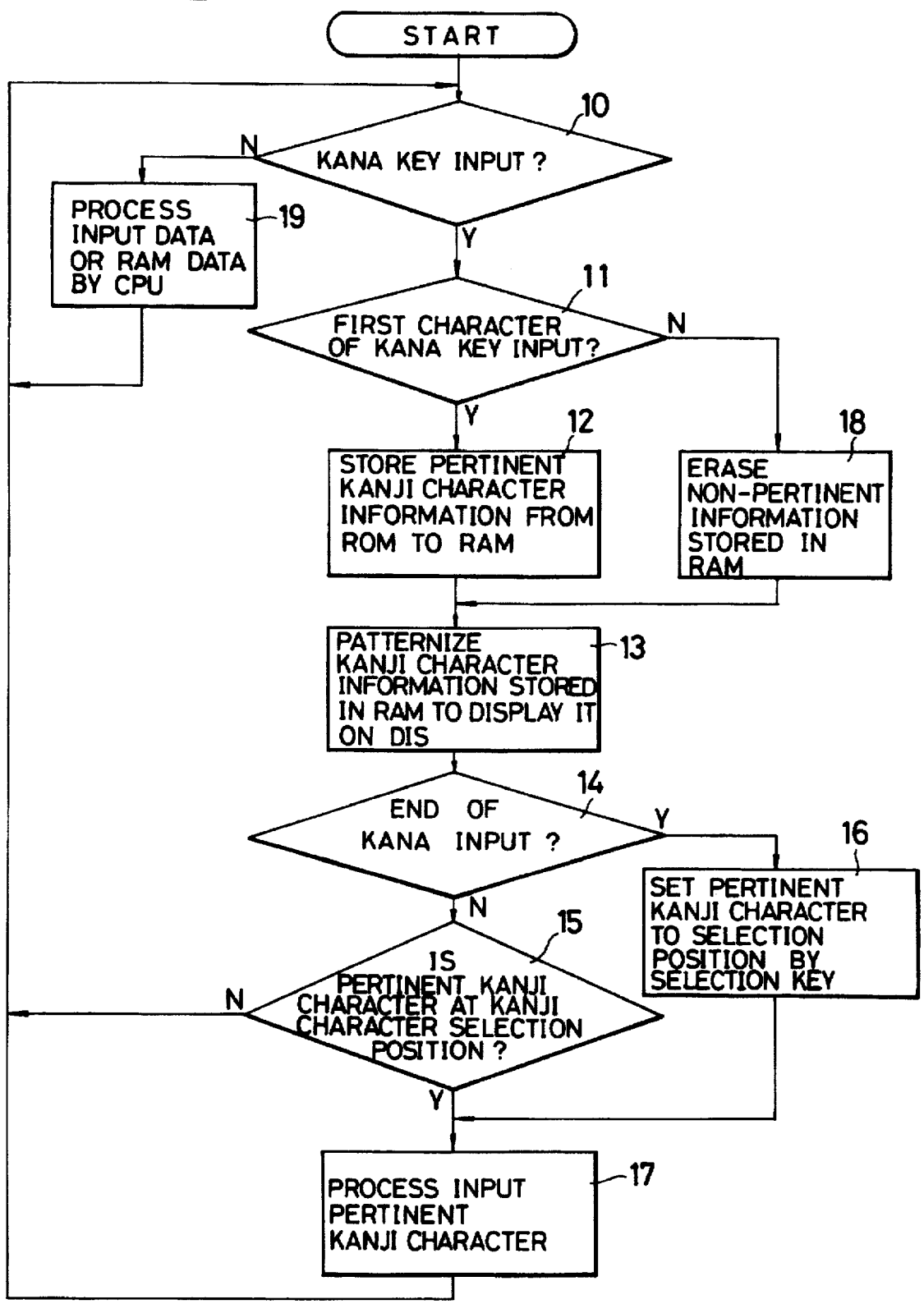
FIG. 2 is a flow chart to explain the operation of the embodiment.

The operation of the present embodiment is explained with reference to a control flow chart FIG. 2.

When an input from the KANA keyboard, 1 is entered (step 10-Y), the CPU 2 checks if the KANA key input is a first KANA input in the KANA-to-KANJI conversion input (step 11), and if it is the first KANA input, the CPU 2 reads out KANJI information starting with that corresponding with the input KANA character, from the KANA-to-KANJI table stored in the ROM 3, and stores it in the RAM 4 (step 12). The retrieved KANJI information is patterned and displayed on the display 5 (step 13). At the end of KANA input for the KANJI information (step 14-Y), a desired KANJI character is selected from the displayed KANJI characters (step 16) to complete the KANA-to-KANJI conversion (step 17). When the KANA input is not yet completed (step 14-N) and if the desired KANJI character is present at a KANJI selection position (step 15-Y), the desired KANJI is selected (step 17) without further continuing the KANA input and the KANA-to-KANJI conversion is terminated. When the KANA input is to be further continued (step 15-N), the next KANA character is inputted (step 11-N) and the KANJI information of the KANJI table stored in the RAM 4 in the step 12 which no longer corresponds to the input KANA information are erased (step 18), and the remaining KANJI information is displayed on the display 5 (step 13). " 市(ichijiru)" is selected.

When the KANA key "る(ru)" is depressed in the column 26, six corresponding KANJI characters are displayed and the cursor CS is at the position of "①涙". If the KANJI character "涙" is to be selected, the identification key is depressed and the subsequent KANA character keying is omitted. However, in the column 27, the KANA key "い(i)" is depressed and four corresponding characters are displayed. The cursor CS is at the position of "①涙". The cursor CS is moved to "②累" by depressing the selection key (column 28), and then the identification key is depressed to select the KANJI character "累(rui)" (column 29). While the KANA characters "る(rui)" were inputted to select the KANJI character "累" in the illustrated example, "累" may be selected by the selection key when only the KANA character "ろ(ru)" is inputted.

In a system in which one of the displayed KANJI characters is selected by a light pen, the desired KANJI character displayed on the display screen can be immediately selected. While the word of the KANJI character is described in the present embodiment, the same advantage will be achieved for an idiom of KANJI characters.

While the electronic equipment having the KANA-to-KANJI conversion function has been shown in the above embodiment, the present invention is also applicable to a translation machine which translates a first language to When the input key is other than KANA key, the input data or the information in the RAM 4 is sequentially processed by the CPU 2 (step 19).

An example of display of the KANA key input and the corresponding KANJI characters is shown in FIG. 3.

Columns 20 to 25 of FIG. 3 illustrate inputting of a KANJI character "食(ichijiru)" and columns 26 to 29 illustrate inputting of a KANJI character "類(rui)". In the column 20, a KANA key "い(i)" is depressed, and KANJI characters corresponding to the input "い(i)" include "①以" to "⑩ 不" and ten others which are not displayed. Since the selection key has not yet been depressed, a cursor CS is at the position of "①以". If the KANJI character "以" is to be selected, the identification key is depressed so that the KANJI character "以" is selected. However, in the column 21, a KANA character "ち(chi)" is inputted and four KANJI characters corresponding to "いち(ichi)" are displayed. In the column 22, a KANA character "じ(ji)" is inputted and the KANJI character "食" remains as the KANJI character corresponding to "いちじ" (ichiji). Since the cursor CS is at the position of "①食" the KANJI character "食(ichijiru)" is selected by depressing the identification key in the column 23. When all KANA characters are to be inputted, the KANA key "ろ(ru)" is depressed in the column 24 and the identification key is depressed in the column 25 so that the KANJI character a second language or vice versa. In this case, words of the second language correspondingly to a word of the first language are displayed for each input of a character of the word of the first language, and the words of the second language which no longer correspond to the word of the first language are erased as the number of characters of the word of the first language increases.

What I claim is:

1. Electronic equipment comprising:

input means for inputting a plurality of characters including a first character, a second character following the first character, and following characters following the second character;

determination means for determining whether or not a character input by said input means is a first character;

storage means, for storing information;

retrieval means for retrieving information from said storage means on the basis of a first character input by said input means;

memory means for storing the information retrieved by said retrieval means;

deleting means, in response to the determination of a second character by said determination means, for deleting unnecessary information among the retrieved information stored in said memory means for each input of the second character and the following characters from the characters input by said input means, the quantity of retrieved information stored in said memory means being decreased for each operation of said deleting means; and control means for controlling display means to display the retrieved information stored in said memory means or the retrieved information from which unnecessary information has been deleted, each time an additional character following a previous character is input.

2. Electronic equipment according to claim 1, wherein said input means comprises a keyboard.

3. Electronic equipment according to claim 1, wherein said storage means stores a plurality of character information corresponding to the plurality of characters input by said input means.

4. Electronic equipment according to claim 1, further comprising operation means for providing instructions for selecting desired information among the retrieved information displayed by the display means.

5. Electronic equipment according to claim 1, further comprising discrimination means for discriminating whether a character input by said input means is the first input character or the second and the following input characters.

6. Electronic equipment comprising:

input means for inputting a plurality of characters including a first character, a second character following the first character, and following characters following the second character;

discrimination means for discriminating whether a character input by said input means is a first character;

storage means for storing a plurality of character information corresponding to the plurality of characters input by said input means;

retrieval means for retrieving the plurality of character information corresponding to the characters input by said input means from said storage means when a character is a first character input by said input means;

deleting means in response to each input of the second and the following characters and a discrimination by said discrimination means that a second character is input for deleting unnecessary word information among the retrieved word information for each input of the second character and the following characters of the characters input by said input means;

control means for controlling display means to display the retrieved word information or the retrieved word information from which unnecessary information has been deleted, each time an additional character following a previous character is input; and manual operation means for selecting desired word information from the retrieved word information displayed by the display means, said manual operation means being capable of instructing the selecting of one of desired word information displayed by the display means with a cursor on the display means.

7. Electronic equipment according to claim 6, wherein said input means comprises a keyboard.

8. Electronic equipment according to claim 6, further comprising operation means for providing instructions for selecting desired information from the retrieved information displayed by the display means.

9. Electronic equipment according to claim 6, further comprising discrimination means for discriminating whether a character input by said input means is the first input character or a second input character and the following input characters.

\* \* \* \* \*

UNITED STATES PATENT AND TRADEMARK OFFICE
CERTIFICATE OF CORRECTION

PATENT NO. : 5,713,033           Page 1 of 2
DATED      : January 27, 1998
INVENTOR(S): ICHIRO SADO It is certified that error appears in the above-identified patent and that said Letters Patent is hereby corrected as shown below:

On the title page, item [56], U.S. Patent Documents

Insert: --RE 32,773 10/1988 Goldwasser...364/419.1
            5,305,205 4/1994 Weber et al. ...364/419.1
            4,893,238 1/1990 Venema...364--.

COLUMN 2

Line 14, "selection" should read --a selection--.
    Line 34, "with the" should be deleted.
    Line 52, "" 著 (ichijiru)" is selected" should be moved to Column 3, line 41, after "character".

COLUMNS 2 and 3

Column 2, line 53 through Column 3, line 12 should be moved to Column 3, line 41 before "a".

UNITED STATES PATENT AND TRADEMARK OFFICE
CERTIFICATE OF CORRECTION

PATENT NO. : 5,713,033  
DATED : January 27, 1998  
INVENTOR(S) : ICHIRO SADO

Page 2 of 2

It is certified that error appears in the above-identified patent and that said Letters Patent is hereby corrected as shown below:

<u>Column 3</u>

Line 36, before "the" (second occurrence) insert --,--.  
   Line 56, "means," should read --means--.

Signed and Sealed this

Eighteenth Day of August, 1998

*Attest:*

BRUCE LEHMAN

*Attesting Officer*      *Commissioner of Patents and Trademarks*